United States Patent
Ushiku

(10) Patent No.: US 9,614,902 B2
(45) Date of Patent: Apr. 4, 2017

(54) DATA PROCESSING APPARATUS USING NETWORK-ON-CHIP TECHNOLOGY AND CONTROL METHOD THEREFOR

(71) Applicant: CANON KABUSHIKI KAISHA, Tokyo (JP)

(72) Inventor: Toru Ushiku, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 160 days.

(21) Appl. No.: 14/375,995

(22) PCT Filed: Oct. 8, 2013

(86) PCT No.: PCT/JP2013/077875
§ 371 (c)(1),
(2) Date: Jul. 31, 2014

(87) PCT Pub. No.: WO2014/061621
PCT Pub. Date: Apr. 24, 2014

(65) Prior Publication Data
US 2014/0379907 A1    Dec. 25, 2014

(30) Foreign Application Priority Data
Oct. 18, 2012 (JP) ................. 2012-230944

(51) Int. Cl.
*H04L 29/08* (2006.01)
*H04L 12/26* (2006.01)
*H04L 12/12* (2006.01)

(52) U.S. Cl.
CPC ............. *H04L 67/10* (2013.01); *H04L 12/12* (2013.01); *H04L 43/0876* (2013.01); *Y02B 60/32* (2013.01); *Y02B 60/34* (2013.01)

(58) Field of Classification Search
CPC ...... G06F 1/3203; G06F 1/324; G06F 1/3296; G06F 13/4022; G06F 17/5054;
(Continued)

(56) References Cited

U.S. PATENT DOCUMENTS 7,795,955 B2    9/2010 Yamada et al.
2008/0057896 A1*  3/2008 Kim ..................... G06F 1/3203
                                                   455/187.1
(Continued)

FOREIGN PATENT DOCUMENTS

JP    2009-181287 A    8/2009
WO    2011126816 A2   10/2011
WO    2011142087 A1   11/2011

OTHER PUBLICATIONS

Hiroki Matsutani et al., "Run-Time Power Gating of On-Chip Routers Using Look-Ahead Routing," Mar. 2008, IEEE 2008 Asia and South Pacific Design Automation Conference, p. 55-60, ieeexplore.ieee.org/xpls/abs_all.jsp?arnumber=4484015.*

(Continued)

*Primary Examiner* — Ruolei Zong
(74) *Attorney, Agent, or Firm* — Rossi, Kimms & McDowell LLP

(57) ABSTRACT

A data processing apparatus which enables power saving in a NoC structure that is not limited in routing. The data processing apparatus has a plurality of data processing modules, which performs data processing, and a plurality of routers, which relays data transmission between the plurality of data processing modules. It is determined whether or not data is stored in a connected data processing module among the plurality of data processing modules, and according to a result of the determination, a power saving instruction or a wakeup interrupt is issued for the connected data processing module.

6 Claims, 9 Drawing Sheets

(58) Field of Classification Search
CPC ..... G06F 1/3237; G06F 1/3287; H04L 12/12; H04L 49/109
USPC ........................................................ 709/224
See application file for complete search history.

(56) References Cited

U.S. PATENT DOCUMENTS

| | | | | |
|---|---|---|---|---|
| 2009/0106569 A1* | 4/2009 | Roh | ...................... | G06F 1/3203 713/300 |
| 2012/0011383 A1* | 1/2012 | Bhoj | ........................ | G06F 1/26 713/323 |
| 2012/0066545 A1* | 3/2012 | Abe | .................... | G06F 11/1654 714/5.1 |
| 2013/0028090 A1* | 1/2013 | Yamaguchi | ........... | G06F 1/3206 370/235 |

OTHER PUBLICATIONS

International Search Report (Form PCT/ISA/210) issued in PCT/JP2013/077875, dated Jan. 7, 2014.
Written Opinion (Form PCT/ISA/237) issued in PCT/JP2013/077875, dated Dec. 20, 2013.
Axel Jantsch and Hannu Tenhunen (Eds.), "Networks on Chip", UK, Kluwer Academic Publishers. (2003).
V. Soteriou, et al., "Exploring the Design Space of Self-Regulating Power-Aware on/Off Interconnection Networks", IEEE Transactions on Parallel and Distributed Systems; vol. 18, No. 3, Mar. 2007, pp. 393-408.

* cited by examiner

DATA PROCESSING APPARATUS USING NETWORK-ON-CHIP TECHNOLOGY AND CONTROL METHOD THEREFOR

TECHNICAL FIELD

The present invention relates to a data processing apparatus using the NoC (Network-on-Chip) technology and a control method therefor.

BACKGROUND ART

NoC (Network-on-Chip) is known as a technology for data communication between IP (intellectual property) cores in a data processing apparatus (see NPL (Non Patent Literature) 1). This technology applies computer networking theory to communication between modules on a chip.

A system using NoC generally has a plurality of data processing modules (IP cores) and a plurality of routers (switches). The data processing modules send and receive data via the routers. Communication paths for data can be set from firmware or the like. As a result, for example, the sequence of data processing modules which process data can be dynamically changed, and therefore, a flexible data processing apparatus can be realized.

Moreover, because the plurality of data processing modules carries out communications via the routers, it is unnecessary to directly connect the plurality of data processing modules together by signal lines exhaustively. For this reason, wiring can be reduced. Further data processing modules can be added with ease, and hence extensibility is great.

The routers each have a plurality of input ports and a plurality of output ports and select a suitable output port for data input to each input port and output the data. Conventionally, when selecting an output port as an output destination of data, routers generally refer to information attached to received data. For example, Chapter 10 of NPL 1 and NPL (Non Patent Literature) 2 describe a technique of adding address information for identifying a transmission destination to communication data and performing routing based on the address information.

There has also been proposed a method as a energy-saving technology in a NOC structure that stops operation of a link by shutting off power supply to a buffer (see NPL 2).

CITATION LIST

Non Patent Literature

{NPL 1} Axel Jantsch and Hannu Tenhunen, "Networks on Chip", UK, Kluwer Academic Publishers.
{NPL 2} V. Soteriou, et al., "Exploring the Design Space of Self-Regulating Power-Aware On/Off Interconnection Networks", IEEE Transactions on Parallel and Distributed Systems; Vol. 18, No. 3, March 2007, pp. 393-408

SUMMARY OF INVENTION

Technical Problem

The prior arts described above are limited in routing because operation of a link is stopped.

The present invention provides a data processing apparatus and a control method therefor which enable power saving in an NoC structure that is not limited in routing.

Solution to Problem

Accordingly, a first aspect of the present invention provides a data processing apparatus comprising a plurality of data processing modules configured to perform data processing, and a plurality of routers configured to relay data transmission between the plurality of data processing modules, wherein the plurality of routers each comprise a determination unit that determines whether data is stored in a connected data processing module among the plurality of data processing modules, and an issuing unit that issues a power saving instruction or a wakeup interrupt for the connected data processing module according to a result of the determination by the determination unit.

Accordingly, a second aspect of the present invention provides a control method for a data processing apparatus including a plurality of data processing modules configured to perform data processing, a plurality of routers configured to relay data transmission between the plurality of data processing modules, comprising a determination step of determining whether data is stored in a connected data processing module among the plurality of data processing modules, and an issuing step of issuing a power saving instruction or a wakeup interrupt for the connected data processing module according to a result of the determination in the determination step.

Advantageous Effects of Invention

According to the present invention, power saving in a NoC structure that is not limited in routing is enabled.

The features and advantages of the invention will become more apparent from the following detailed description taken in conjunction with the accompanying drawings.

DESCRIPTION OF EMBODIMENTS

The present invention will now be described in detail with reference to the drawings showing preferred embodiments thereof.

Figure 1:
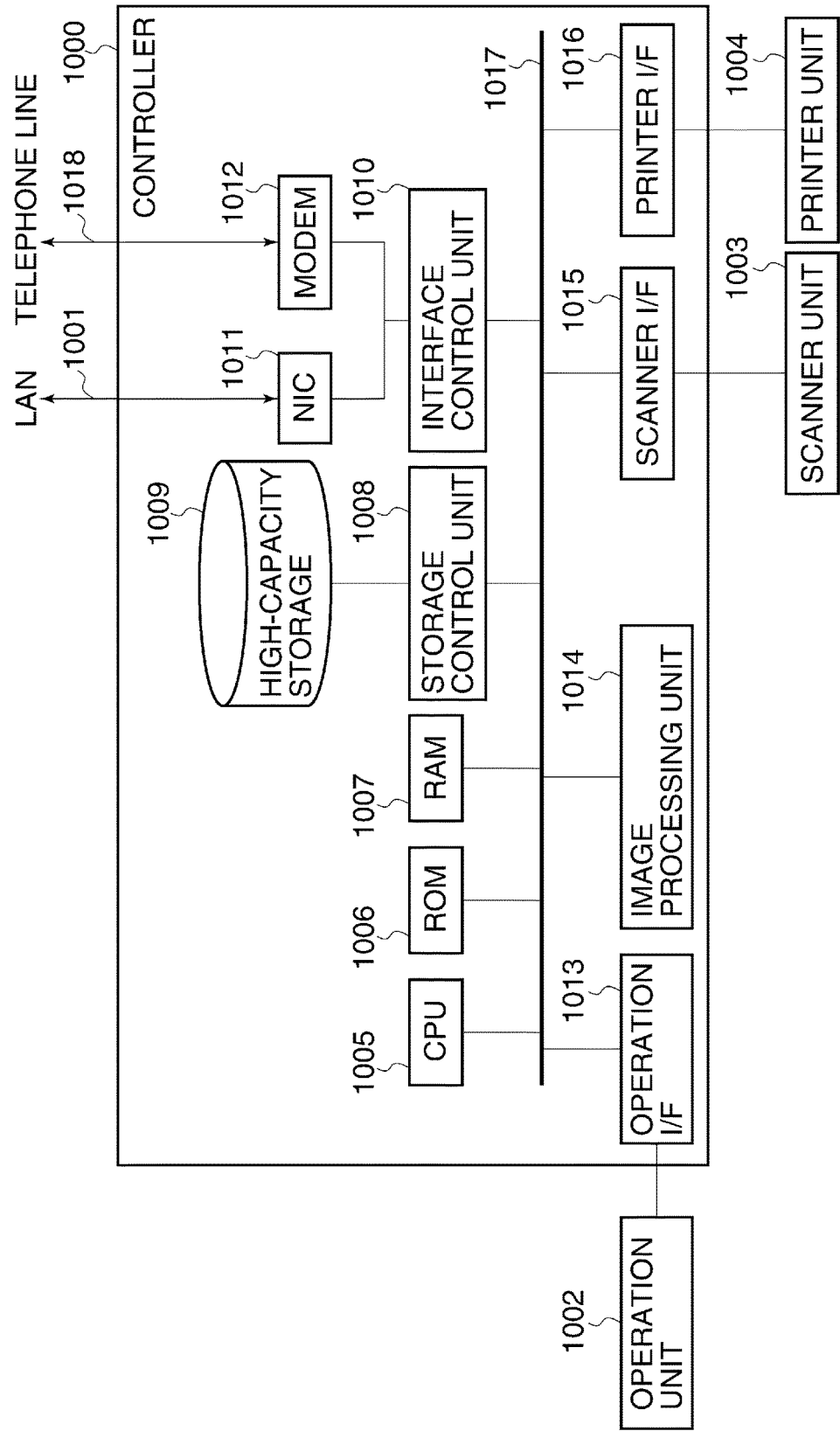
FIG. 1 is a block diagram schematically showing an arrangement of a digital multifunctional peripheral equipped with a data processing apparatus according to a first embodiment of the present invention.

FIG. 1 is a block diagram schematically showing an arrangement of a digital multifunctional peripheral equipped with a data processing apparatus according to a first embodiment of the present invention.

Referring to FIG. 1, the digital multifunctional peripheral has a controller 1000, an operation unit 1002, a scanner unit 1003, and a printer unit 1004.

The controller 1000 has functional units described hereafter.

A CPU 1005 controls the entire digital multifunctional peripheral. The CPU 1005 starts an OS (operating system) by a boot program stored in a ROM 1006. The CPU 1005 causes a controller program and a variety of application program, which are stored in a high-capacity storage 1009, to be executed on the OS. The CPU 1005 is connected to components by an internal bus such as a data bus 1017.

A RAM 1007 acts as a temporary storage area such as main memory or a work area for the CPU 1005. The RAM 1007 is also used as a temporary storage area for image processing.

An interface control unit 1010 controls a network I/F such as a NIC (network interface card) 1011 to send and receives a variety of data such as image data to and from a network such as a LAN 1001. The interface control unit 1010 controls a modem 1012 to send and receive data to and from a telephone line 1018.

An operation I/F 1013 receives operating instructions from a user via an operation unit 1002 having operating means such as a touch panel or hardware keys. The operation I/F 1013 controls the operation unit 1002 having display means such as an LCD or a CRT to display an operation screen for the user.

Based on data received via the interface control unit 1010, an image processing unit 1014 generates bitmap data, which can be processed by the printer unit 1004 via the printer I/F 1016, and generate attribute data. The image processing unit 1014 also corrects, processes, and edits bitmap data received from the scanner unit 1003 via a scanner I/F 1015. It should be noted that the image processing unit 1014 determines whether or not received bitmap data is of a color original, a monochrome original, a character original, or a photo original. The image processing unit 1014 attaches a result of the determination as attribute data to image data. Further, the image processing unit 1014 carries out image processing for a printer and sends the bitmap data described above to the printer unit 1004 via a printer I/F 1016.

Although in the description of the present embodiment, the image processing unit 1014 is taken up as an exemplary data processing apparatus, the present invention is not limited to this.

Figure 2:
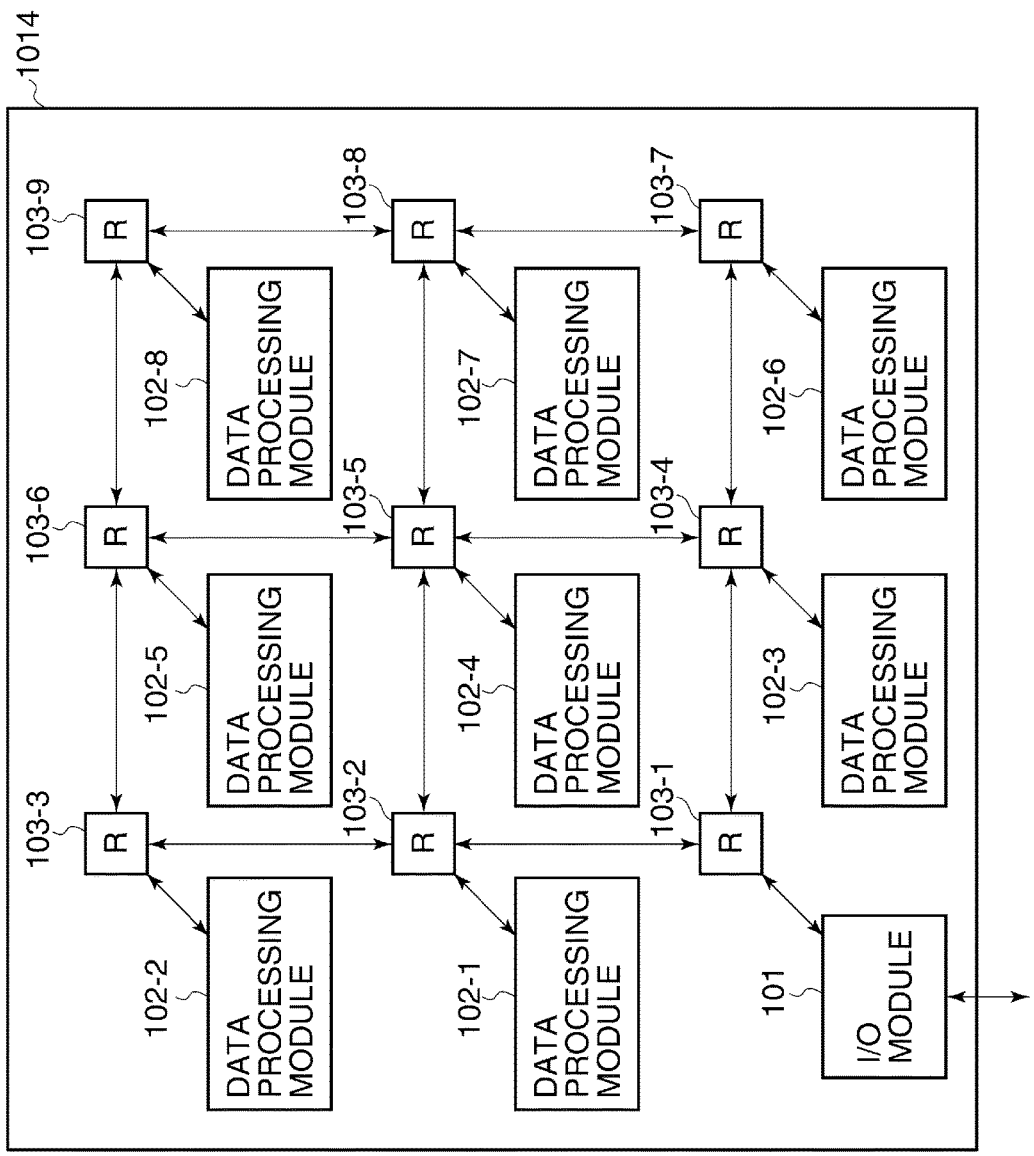
FIG. 2 is a diagram schematically showing an internal arrangement of an image processing unit appearing in FIG. 1.

FIG. 2 is a diagram schematically showing an internal arrangement of the image processing unit 1014 appearing in FIG. 1.

An I/O module 101 inputs and outputs image data to and from the image processing unit 1014.

A plurality of data processing modules 102-1 to 102-8 carries out, for example, a bitmap forming process, a color space conversion process, a filtering process, and a resolution conversion process on image data input to the I/O module 101. The placement of these modules should not necessarily correspond to the order in which image data is processed. A variety of processes such as the bitmap forming process are realized by all or some of the plurality of data processing modules 102-1 to 102-8 concurrently carrying out each process or sequentially carrying out each process. In the following description, the plurality of data processing modules 102-1 to 102-8 is collectively referred to as the data processing module 102.

A plurality of routers 103-1 to 103-9 relays data transmission between the plurality of data processing modules and dynamically routes input image data. As a result, the order in which a plurality of processes is carried out by the respective data processing modules 102-1 to 102-8 can be changed according to operation modes executable by the digital multifunctional peripheral, and moreover, a plurality of data sequences differing in processing order can be processed at the same time. In the following description, the plurality of routers 103-1 to 103-9 is collectively referred to as the router 103.

It should be noted that in the present embodiment, because the image processing unit 1014 in the controller 1000 of the digital multifunctional peripheral is used as an exemplary data processing apparatus, input data is image data, but input data is not limited to image data.

Next, a description will be given of an arrangement of the routers 103-1 to 103-9 appearing in FIG. 2.

Figure 3:
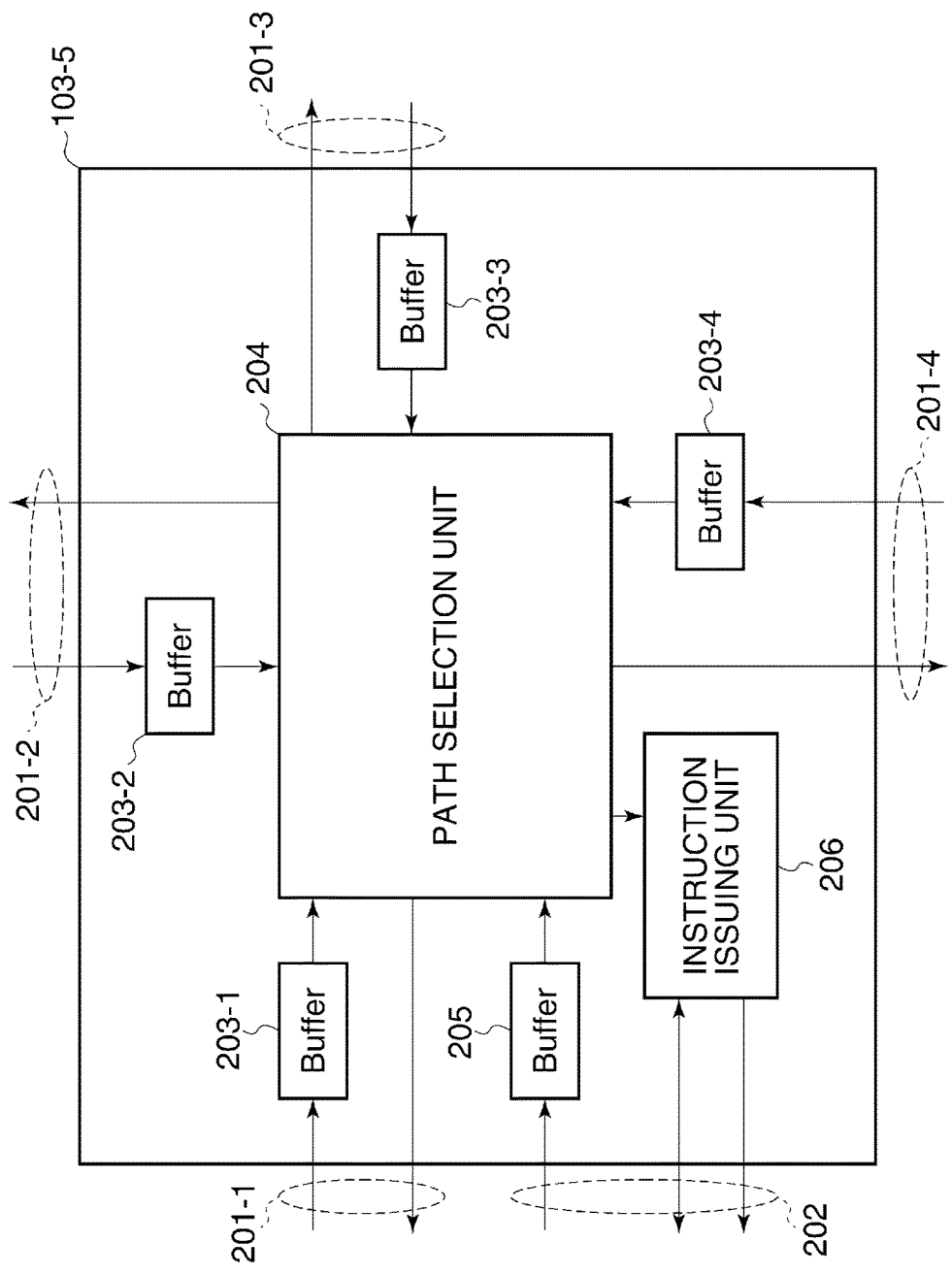
FIG. 3 is a block diagram schematically showing an arrangement of a plurality of routers appearing in FIG. 2.

FIG. 3 is a block diagram schematically showing the arrangement of the routers 103-1 to 103-9 appearing in FIG. 2. It should be noted that the routers 103-1 to 103-9 have the same arrangement, and hence a description will be given of the router 103-5 as a representative.

The router 103-5 has a plurality of input-output ports 201-1 to 201-4 for connecting to other routers, and an input-output port 202 for connecting to the data processing module 102. Buffers 203-1 to 203-4 and 205 are connected to respective input ports of the plurality of input-output ports 201-1 to 201-4 and 202.

The router 103-5 also has a path selection unit 204. This path section unit 204 has a function of transferring image data, which is input from a predetermined input port, to a predetermined output port.

The router 103-5 also has an instruction issuing unit 206 that issues an instruction to the data processing module 102. The instruction issuing unit 206 sends, as an instruction to the data processing module 102, image data as an object to be processed.

A description will now be given of an arrangement of the path selection unit 204 appearing in FIG. 3.

Figure 4:
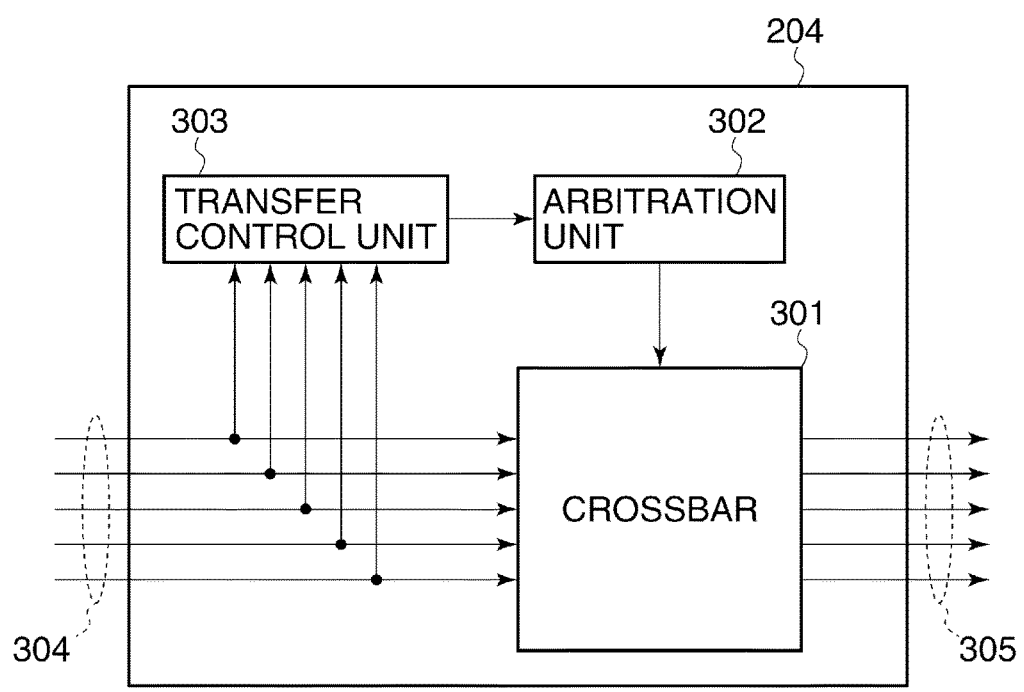
FIG. 4 is a block diagram schematically showing an arrangement of a path selection unit appearing in FIG. 3.

FIG. 4 is a block diagram schematically showing the arrangement of the path selection unit 204 appearing in FIG. 3.

The path section unit 204 has a crossbar 301, an arbitration unit 302, a transfer control unit 303, five input ports 304, and five output ports 305.

The transfer control unit 303 retrieves a path for data transfer from address information on input image data (hereafter also referred to as "input data") and information on the retrieved path to the arbitration unit 302. It should be noted that address information on the data processing module 102 is for identifying a transmission destination of data.

The crossbar 301 transfers data based on path information supplied from the arbitration unit 302. The arbitration unit 302 is a well-known arbitration circuit, and hence description thereof is omitted.

Next, a description will be given of how the path selection unit 204 determines a data transfer path based on address information.

In the present embodiment, address information on input data is represented in coordinates as shown in the figure.

Figure 5:
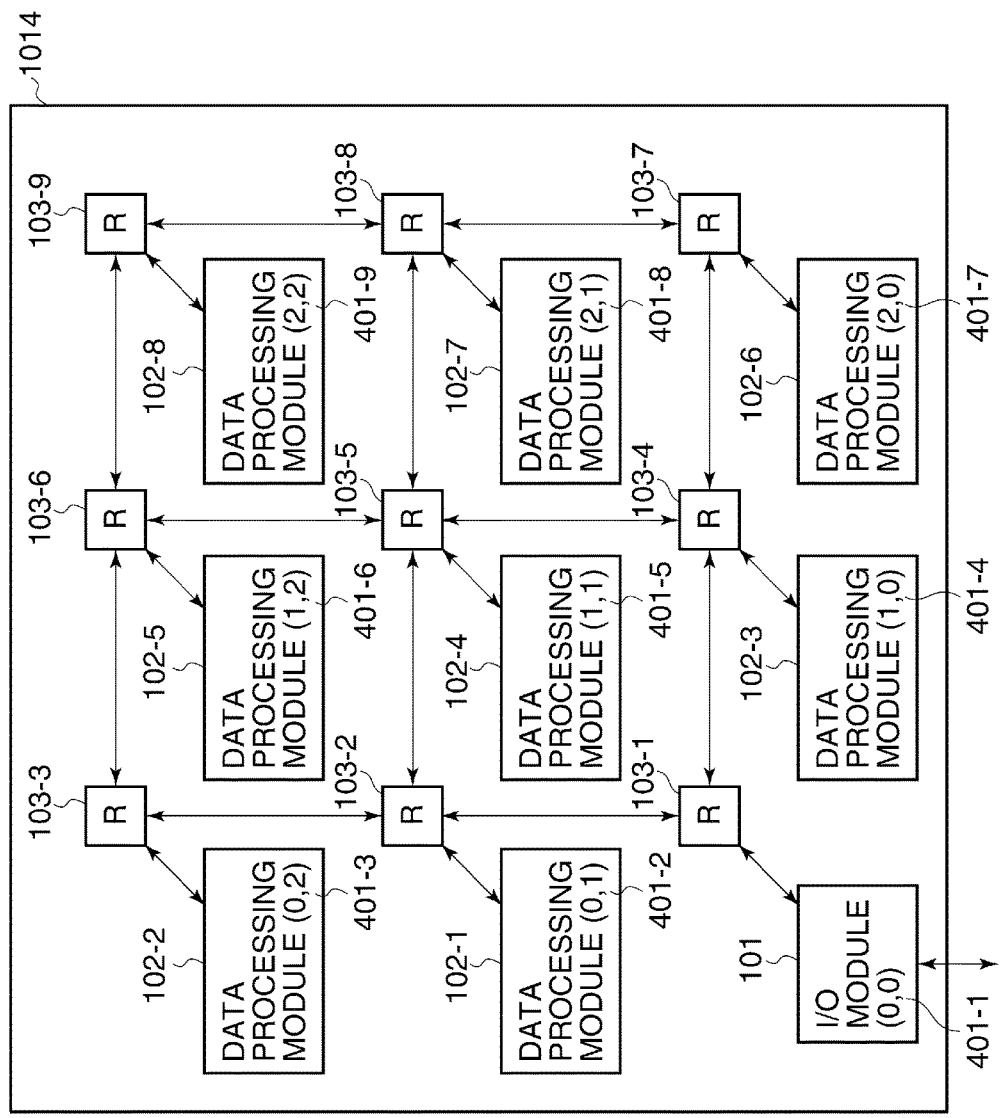
FIG. 5 is a diagram showing exemplary address information on a plurality of data processing modules in the image processing unit appearing in FIG. 2.

Address information on the data processing modules 102-1 to 102-8 in the image processing unit 1014 appearing in FIG. 2 is shown in FIG. 5.

Referring to FIG. 5, it is assumed that coordinates 401-1 of the I-O module 101 are (0, 0). It is also assumed that coordinates 401-2 of the data processing module 102-1 are (0, 1), and coordinates 401-3 of the data processing module 102-2 are (0, 2). Further, it is assumed that coordinates 401-4 of the data processing module 102-3 are (1, 0), coordinates 401-5 of the data processing module 102-4 are (1, 1), and coordinates 401-6 of the data processing module 102-5 are (1, 2). Further, it is assumed that coordinates 401-7 of the data processing module 102-6 are (2, 0), and coordinates 401-8 of the data processing 102-7 are (2, 1), coordinates 401-9 of the data processing 102-8 are (2, 2).

In this way, coordinate information for identifying the data processing modules 102 placed in the image processing unit 1014 are assigned to the respective data processing modules 102.

Next, a description will be given of the flow of a data transfer path determination process carried out by the path selection unit 204.

Figure 6:
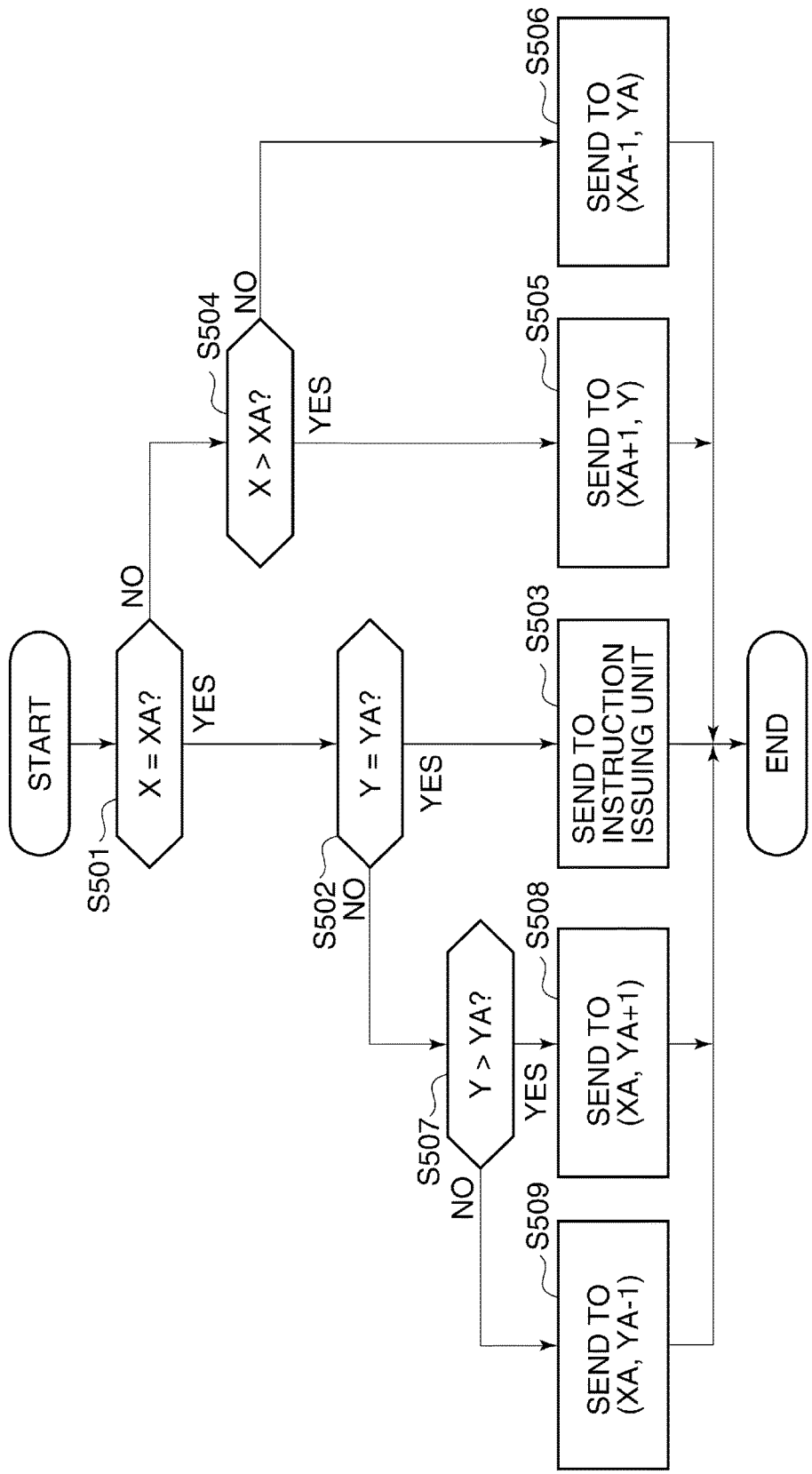
FIG. 6 is a flowchart showing the flow of a data transfer path determination process carried out by the path selection unit.

FIG. 6 is a flowchart showing the flow of the data transfer path determination process carried out by the path selection unit 204.

In the following description of the present embodiment, address information on input data is expressed in (X, Y), and an address of the data processing module 102 connected to the router 103 having the path selection unit 204 that carries out the determination process is expressed in (XA, YA).

First, the path selection unit 204 determines whether or not X in the address information (X, Y) on the input data is equal to XA in the address of the data processing module 102 (step S501). When the path selection unit 204 determines that X=XA, the process proceeds to step S502, and on the other hand, when the path selection unit 204 determines that X≠XA, the process proceeds to step S504.

In the step S502, the path selection unit 204 determines whether or not Y in the address information (X, Y) on the input data is equal to YA in the address of the data processing module 102. When the path selection unit 204 determines that Y=YA, the process proceeds to step S503, and on the other hand, when the path selection unit 204 determines that Y≠YA, the process proceeds to step S507.

In the step S503, the path selection unit 204 sends the input data to the instruction issuing unit 206 (step S503). As a result, the instruction issuing unit 206 sends the input data to the data processing module 102 connected to the router 103.

In the step S504, the path selection unit 204 determines whether or not X in the address information (X, Y) on the input data is greater than XA in the address of the data processing module 102. When, as a result of the determination, X is greater than XA, the path selection unit 204 sends the input data to the router 103 connected to the data processing module 102 having an address (XA+1, YA) (step S505). On the other hand, when, as a result of the determination in the step S504, X is not greater than XA, the path selection unit 204 sends the input data to the router 103 connected to the data processing module 102 having an address (XA−1, YA) (step S506).

In the step S507, the path selection unit 204 determines whether or not Y in the address information (X, Y) on the input data is greater than YA in the address of the data processing module 102. When, as a result of the determination, Y is greater than YA, the path selection unit 204 sends the input data to the router 103 connected to the data processing module 102 having an address (X, YA+1 (step S508). On the other hand, when, as a result of the determination in the step S507, Y is not greater than YA, the path selection unit 204 sends the input data to the router 103 connected to the data processing module 102 having an address (XA, YA−1) (step S509).

The process described above enables transfer of image data, which is input from input ports of the router 103, using five output ports based on address information.

Next, a description will be given of an arrangement of the instruction issuing unit 206 appearing in FIG. 3.

Figure 7:
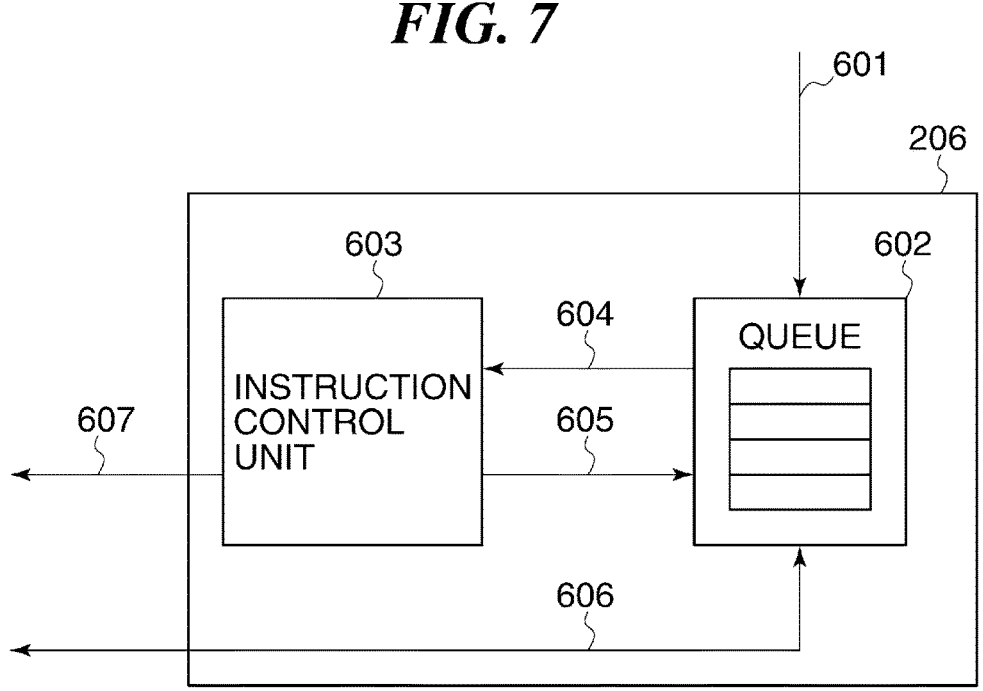
FIG. 7 is a diagram schematically showing an arrangement of an instruction issuing unit appearing in FIG. 3.

FIG. 7 is a diagram schematically showing the arrangement of the instruction issuing unit 206 appearing in FIG. 3.

The instruction issuing unit 206 has a queue 602 in which input data 601 input from the path selection unit 204 is stored as an instruction for the data processing module 102. The instruction issuing unit 206 also has an instruction control unit 603, and the instruction control unit 603 receives a queue status 604, which is indicative of a status of the queue 602, from the queue 602, issues a wakeup interrupt 607 for the data processing module 102, and issues a power saving instruction 605 for the queue 602. The instruction is given to the data processing module 102 by sending an instruction signal 606 from the queue 602.

Next, a description will be given of the flow of an instruction issuing process by the instruction issuing unit 206, which is carried out for the data processing module 102.

Figure 8:
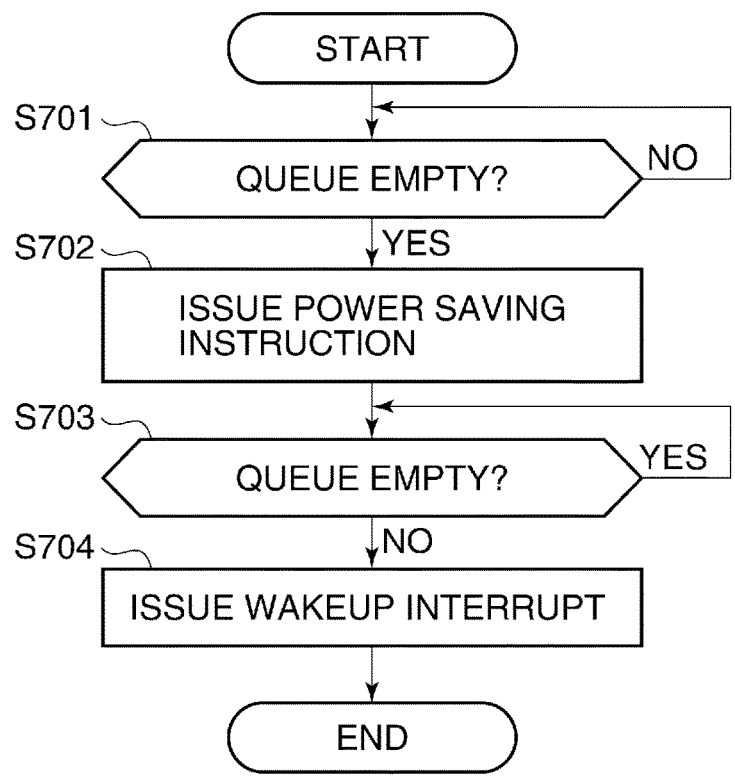
FIG. 8 is a flowchart showing the flow of a wakeup interrupt/power saving instruction issuing process carried out by an instruction control unit.

FIG. 8 is a flowchart showing the flow of a wakeup interrupt/power saving instruction issuing process carried out by the instruction control unit 603.

Referring to FIG. 8, first, the instruction control unit 603 analyzes the queue status 604 received from the queue 602 and determines whether or not the queue 602 is empty (step S701). Upon determining that the queue 602 is not empty, the instruction control unit 603 repeatedly executes the step S701 until the queue 602 becomes empty. Upon determining in the step S701 that the queue 602 is empty, the instruction control unit 603 issues the power saving instruction 605 for the queue 602 (step S702).

After the step S702, the instruction control unit 603 analyzes the queue status 604 received from the queue 602 and determines whether or not the queue 602 is empty (step S703). Upon determining in the step S703 that the queue 602 is empty, the instruction control unit 603 repeatedly executes the step S703 until an instruction is stored in the queue 602. Upon determining in the step S703 that the queue 602 is not empty, the instruction control unit 603 issues the wakeup interrupt 607 for the data processing module 102 (step S704).

Thus, the instruction control unit 603 issues the power saving instruction 605 or the wakeup interrupt 607 according to whether or not data on the data processing module 102 is stored in the queue 602 and controls power of the data processing module 102.

Figure 9:
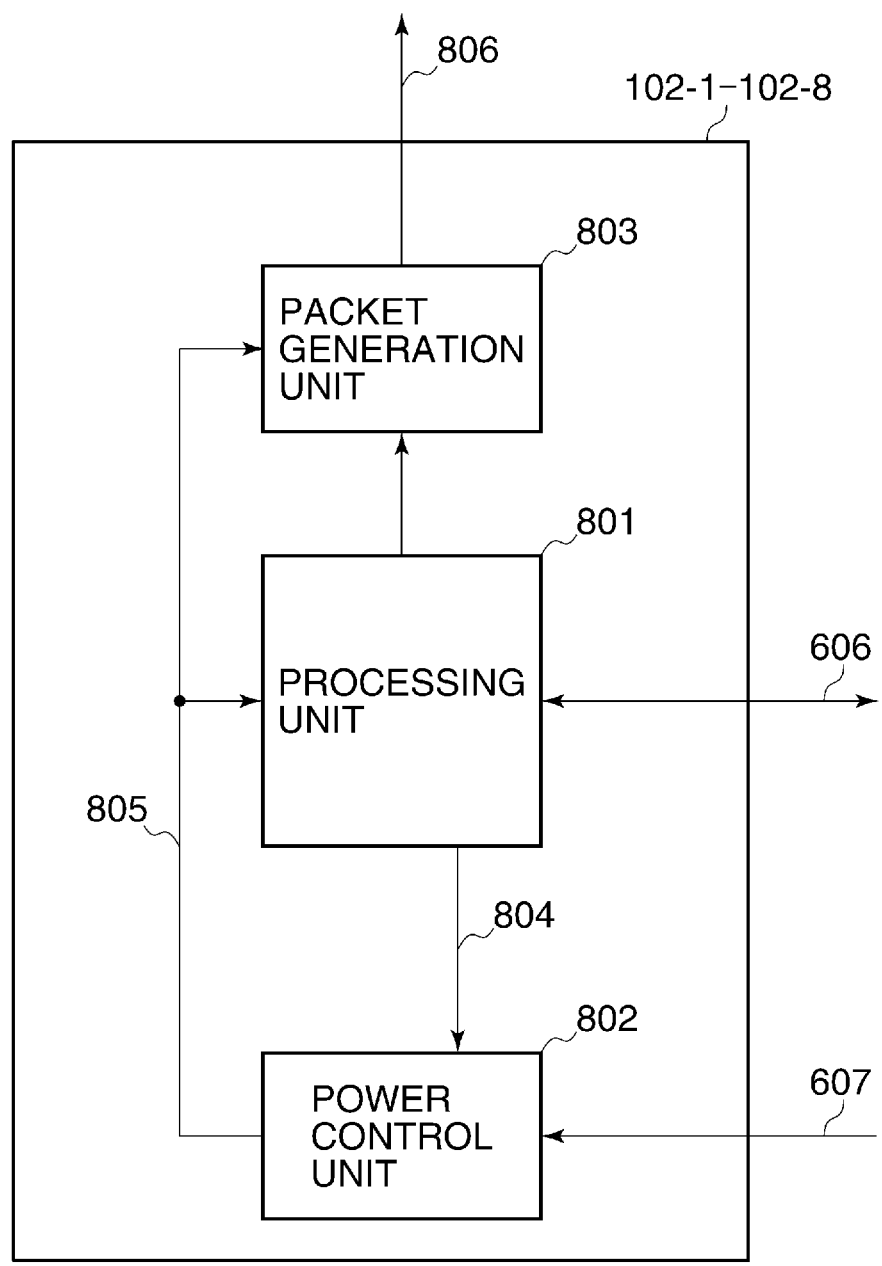
FIG. 9 is a block diagram schematically showing an arrangement of the data processing module appearing in FIG. 3.

FIG. 9 is a block diagram schematically showing an arrangement of the data processing module 102 (102-1 to 102-8) appearing in FIG. 3.

The data processing module 102 is comprised of a processing unit 801 that carries out processing on the instruction signal 606 received from the instruction issuing unit 206 in the router 103, a power control unit 802, which controls power of the processing unit 801 and a packet generation unit 803, and the packet generation unit 803.

Upon determining that the received instruction signal 606 is an instruction for normal processing, the processing unit 801 carries out a process in response to the instruction. Then, the packet generation unit 803 generates a packet comprised of a result of processing by the processing unit 801, an instruction for processing to be carried out next, and a transmission address (address information), and sends the packet to the router 103 via an output port 806.

Upon determining that the received instruction signal 606 is a power saving instruction, the processing unit 801 sends the power saving instruction to the power control unit 802. Upon receiving the power saving instruction, the power control unit 802 stops supplying power 805 to the processing unit 801 and the packet generation unit 803 (energization OFF).

On the other hand, upon receiving the wakeup interrupt 607 from the instruction issuing unit 206 in the router 103, the power control unit 802 starts supplying power 805 to the processing unit 801 and the packet generation unit 803 (energization ON).

As described above, according to the first embodiment, the router 103 issues the power saving instruction 605 or the wakeup interrupt 607 according to whether or not data on the data processing module 102 is stored in the instruction control unit 603 and controls power supply to the data processing module 102. This enables control of power supply to the data processing modules in the NoC structure which is not limited in routing, and power saving of the system can be realized.

A second embodiment of the present invention and the first embodiment described above differ only in an internal arrangement of the data processing module 102 and same in terms of other elements, description of which, therefore, is omitted.

Figure 10:
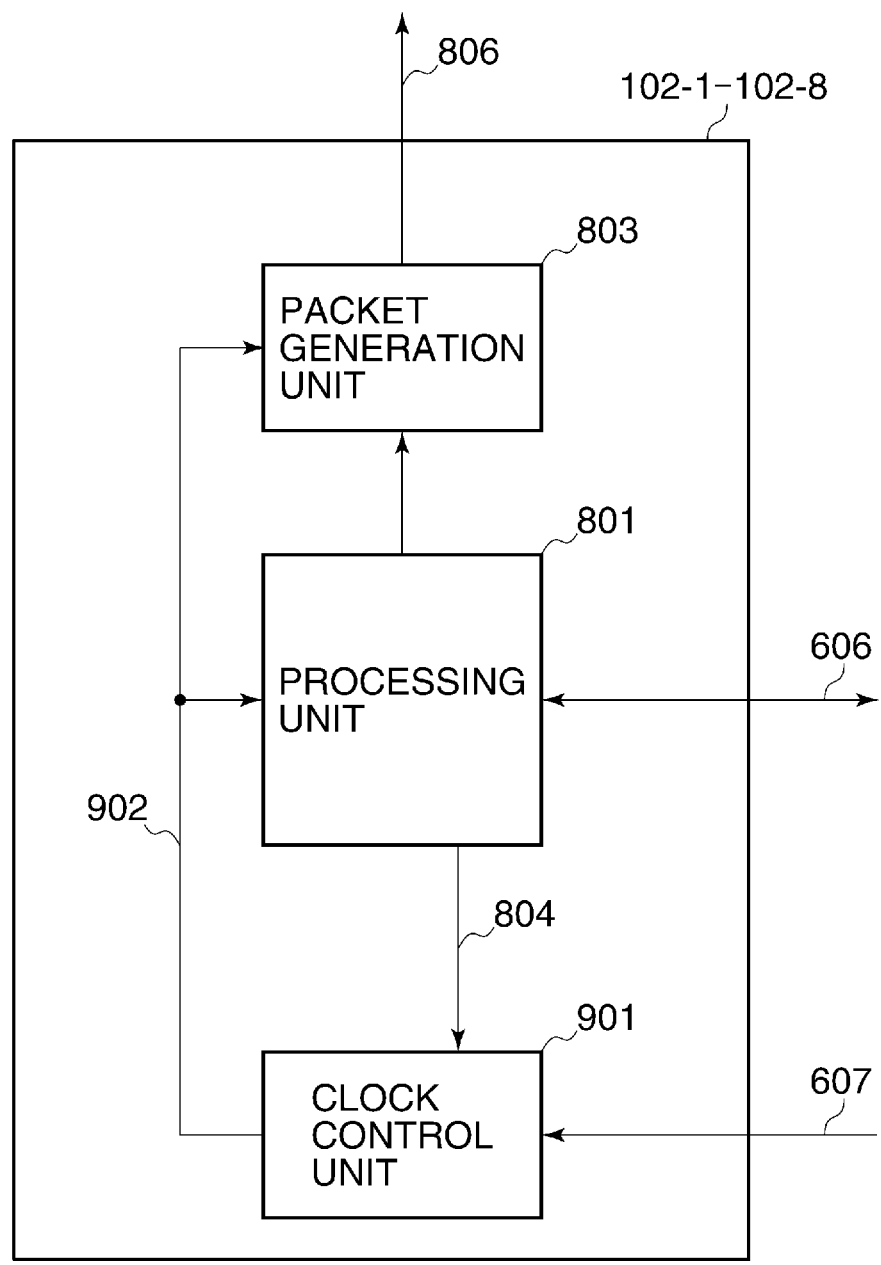
FIG. 10 is a block diagram schematically showing an arrangement of a data processing module according to a second embodiment of the present invention.

FIG. 10 is a block diagram schematically showing an arrangement of the data processing module 102 according to the second embodiment of the present invention.

The data processing module 102 is comprised of the processing unit 801 that carries out processing on the instruction signal 606 received from the instruction issuing unit 206 in the router 103, a clock control unit 901, which controls clocks of the processing unit 801 and the packet generation unit 803, and the packet generation unit 803.

Upon determining that the received instruction signal 606 is an instruction for normal processing, the processing unit 801 carries out a process in response to the instruction. Then, the packet generation unit 803 generates a packet comprised of a result of processing by the processing unit 801, an instruction for processing to be performed next, and a transmission address (address information), and sends the packet via an output port 806.

Upon determining that the received instruction signal 606 is a power saving instruction, the processing unit 801 sends a power saving instruction to the clock control unit 901. Upon receiving the power saving instruction, the clock control unit 901 stops supplying clocks 902 to the processing unit 801 and the packet generation unit 803 (clock OFF).

On the other hand, upon receiving the wakeup interrupt 607 from the instruction issuing unit 206 in the router 103, the clock control unit 901 starts supplying clocks 902 to the processing unit 801 and the packet generation unit 803 (clock ON).

According to the second embodiment, as with the first embodiment, clocks of the data processing modules in the NoC structure, which is not limited in routing, can be controlled, and power-saving of the system can be realized.

Although in the first and second embodiments described above, the data processing apparatus is applied to a digital multifunctional peripheral, the present invention is not limited to this, but it goes without saying that the data processing apparatus may also be applied to a mobile terminal or an electronic device.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

REFERENCE SIGNS LIST

102 Data processing module
103 Router
204 Path selection unit
206 Instruction issuing unit
303 Transfer control unit
602 Queue
603 Instruction control unit
801 Processing unit
802 Power control unit
803 Packet generation unit

The invention claimed is:

1. A data processing apparatus comprising:
   a plurality of data processing modules, each of the plurality of data processing modules including a processor configured to perform data processing; and
   a plurality of routers, each of the plurality of routers transmitting data to one or more adjacent routers, each of the plurality of routers including a controller and a storage connected to the controller,
   wherein the plurality of routers correspond to the plurality of data processing modules one to one and each controller of the plurality of routers is configured to:
      receive data from the one or more adjacent routers;
      determine whether the received data is for a data processing module corresponding to the router that received the data; and
      issue a wakeup instruction for waking up a data processing module from a power saving state, to the data processing module corresponding to the router that received the data according to a result of the determination.

2. The data processing apparatus according to claim 1, wherein, in a case where it is determined that the received data is not for the data processing module corresponding to the router that received the data, the controller corresponding to the router that received the data issues a power saving instruction for the data processing module corresponding to the router that received the data, and when, after the power saving instruction is issued, it is determined that the received data is for the data processing module corresponding to the router that received the data, the controller corresponding to the router that received the data issues the wakeup interrupt for the data processing module corresponding to the router that received the data.

3. The data processing apparatus according to claim 2, wherein upon receiving the power saving instruction, each of the plurality of data processing modules controls power supply.

4. The data processing apparatus according to claim 2, wherein upon receiving the power saving instruction, each of the plurality of data processing modules controls clocks.

5. The data processing apparatus according to claim 1, wherein the controller is further configured to determine a transfer path for input data based on address information on the input data.

6. A control method for a data processing apparatus including a plurality of data processing modules, each of the plurality of data processing modules including a processor configured to perform data processing, a plurality of routers, wherein each of the plurality of routers transmits data to one or more adjacent routers, wherein each of the plurality of routers includes a controller and a storage connected to the controller, and wherein the plurality of routers correspond to the plurality of data processing modules one-to-one, the control method comprising, for each controller:

a receiving step of receiving data from the one or more adjacent routers;

a determination step of determining whether the received data is for a data processing module corresponding to the router that received the data; and an issuing step of issuing a wakeup instruction for waking up a data processing module from a power saving state, to the data processing module corresponding to the router that received the data according to a result of the determination.

* * * * *